US010762645B2

(12) United States Patent
Zhu

(10) Patent No.: US 10,762,645 B2
(45) Date of Patent: Sep. 1, 2020

(54) STEREO VISUAL ODOMETRY METHOD BASED ON IMAGE GRADIENT JOINT OPTIMIZATION

(71) Applicant: ZHEJIANG UNIVERSITY, Hangzhou, Zhejiang (CN)

(72) Inventor: Jianke Zhu, Zhejiang (CN)

(73) Assignee: ZHEJIANG UNIVERSITY, Hangzhou, Zhejiang (CN)

( * ) Notice: Subject to any disclaimer, the term of this patent is extended or adjusted under 35 U.S.C. 154(b) by 99 days.

(21) Appl. No.: 16/305,023

(22) PCT Filed: Dec. 27, 2017

(86) PCT No.: PCT/CN2017/118849
§ 371 (c)(1),
(2) Date: Nov. 27, 2018

(87) PCT Pub. No.: WO2019/029099
PCT Pub. Date: Feb. 14, 2019

(65) Prior Publication Data
US 2019/0333231 A1 Oct. 31, 2019

(30) Foreign Application Priority Data
Aug. 11, 2017 (CN) .......................... 2017 1 0685724

(51) Int. Cl.
G06K 9/00 (2006.01)
G06T 7/285 (2017.01)
(Continued)

(52) U.S. Cl.
CPC .............. *G06T 7/285* (2017.01); *G01C 11/04* (2013.01); *G01C 22/00* (2013.01); *G06T 7/593* (2017.01);
(Continued)

(58) Field of Classification Search
CPC ........... G06T 7/285; G06T 7/593; G06T 7/97; G06T 7/74; G06T 2207/30244;
(Continued)

(56) References Cited

U.S. PATENT DOCUMENTS

2008/0144925 A1* 6/2008 Zhu .......................... G06K 9/32
382/154
2008/0167814 A1* 7/2008 Samarasekera ........... B60R 1/00
701/469
(Continued)

FOREIGN PATENT DOCUMENTS

CN 101598556 A * 12/2009
CN 102607526 A * 7/2012

Primary Examiner — Van D Huynh

(57) ABSTRACT

A stereo visual odometry method based on image gradient joint optimization includes steps of: pre-processing each frame of images of a stereo video input; calculating a stereo image disparity map of a stereo video frame, and obtaining a metric distance; scaling to form scale images with different scales for forming a pyramid model, and calculating features to obtain a series of feature images; processing the images with a Kalman filter according to the metric distance, so to predict and estimate a motion process of a camera pose, wherein camera motion models is built in the Kalman filter; accurately calculating a camera pose of a current frame by using a gradient-based stereo visual navigation method; and updating the camera motion models in the Kalman filter with the camera pose of the current frame.

10 Claims, 4 Drawing Sheets

(51) Int. Cl.
  *G06T 7/73* (2017.01)
  *G06T 7/00* (2017.01)
  *G06T 7/593* (2017.01)
  *G01C 11/04* (2006.01)
  *G01C 22/00* (2006.01)

(52) U.S. Cl.
  CPC .............. *G06T 7/74* (2017.01); *G06T 7/97* (2017.01); *G06T 2207/10021* (2013.01); *G06T 2207/30244* (2013.01)

(58) Field of Classification Search
  CPC . G06T 2207/10021; G06T 7/73; G01C 22/00; G01C 11/04; G01C 3/14
  USPC .......................................................... 382/154
  See application file for complete search history.

(56) References Cited

U.S. PATENT DOCUMENTS

| | | | | |
|---|---|---|---|---|
| 2011/0316980 | A1* | 12/2011 | Dubbelman | G06T 7/97 348/47 |
| 2014/0293016 | A1* | 10/2014 | Benhimane | G06T 7/246 348/50 |
| 2015/0304634 | A1* | 10/2015 | Karvounis | G06K 9/00201 348/46 |
| 2018/0232906 | A1* | 8/2018 | Kim | G06T 7/251 |

* cited by examiner

STEREO VISUAL ODOMETRY METHOD BASED ON IMAGE GRADIENT JOINT OPTIMIZATION

CROSS REFERENCE OF RELATED APPLICATION

This is a U.S. National Stage under 35 U.S.C 371 of the International Application PCT/CN2017/118849, filed Dec. 27, 2017, which claims priority under 35 U.S.C. 119(a-d) to CN 201710685724.8, filed Aug. 11, 2017.

BACKGROUND OF THE PRESENT INVENTION

Field of Invention

The present invention relates to a computer vision field and related technologies of image processing, and more particularly to a visual odometry method based on image gradient joint optimization.

Description of Related Arts

After years of exploration and development, computer vision has been applied in many fields such as robotics, autonomous driving, digital entertainment, medical health, security monitoring, and military technology. Visual odometry is not only an important part of robotic and unmanned vehicle visual navigation systems, but also an important research branch in the field of computer vision and robotics. The present invention aims to propose a fast and effective stereo visual odometry method. Visual odometry is the research basis and premise of target localization, pose estimation, mapping, scene understanding and other topics. An excellent visual odometry method can provide strong support and guarantee for many research topics.

The main task of the visual odometry method is to estimate in real time the relative 6-degree-of-freedom pose of the camera relative to the initial reference state from the input video, including the relative displacement of the three coordinate axes of X-Y-Z, and the three rotations around the coordinate axis. At the same time, the by-product to estimate the camera pose is a sparse or dense reconstruction of the scene. The method based on sparse feature point matching needs to triangulate the matching points of different video frames to obtain 3D sparse reconstruction, and the method based on direct image alignment uses stereo vision to obtain dense 3D reconstruction results, which establishes the foundation for scene reconstruction. Therefore, the visual odometry method not only provides global pose and position information, but also completes preliminary mapping and scene reconstruction. It is the first step of robot and unmanned vehicle autonomous navigation system and plays a vital role.

Visual odometry is an important problem in the field of robotics and computer vision. It is the core technology for applications such as augmented reality, autonomous vehicles, and robot navigation. Conventionally, main visual odometry and simultaneous positioning and map reconstruction algorithms usually adopt a solution based on coefficient feature point matching, which cannot fully utilize the information of the entire image, and can only perform sparse reconstruction of the scene. On the other hand, direct image alignment uses the information of the entire image, and can generate a dense point cloud of the scene, which is a technical direction with broad prospects. However, the main drawback of the direct method is the camera small motion hypothesis and tendency of converging to local optimum, making this method performs weaker in KITTI visual milemeter test than the feature point matching based strategy.

In conventional visual navigation KITTI evaluation platform, the direct visual navigation method based on dense observation fails to achieve the desired result. The main reasons can be summarized as follows: 1) Image alignment based on Lucas-Kanade framework limits the theoretical convergence domain, and it is unable to cope with the large displacement scene of 10 Hz sampling in the dataset, which needs very good motion estimation method to compensate; 2) The KITTI dataset is derived from the actual driving scene, including different driving environments such as cities, villages and highways; direct use of pixel grayscale values and affine illumination models cannot cope with the effects of complex ambient lighting environments such as road surface reflections, tree shades and architectural shadows; 3) imperfect camera calibration and stereo vision matching algorithm accuracy directly affect the accuracy of visual navigation results, wherein conventional stereoscopic matching evaluates the accuracy of the disparity estimation within the coverage, while the visual navigation requires accurate point-to-point disparity estimation. The algorithm in the forefront of the stereoscopic visual evaluation fails to improve the navigation accuracy.

SUMMARY OF THE PRESENT INVENTION

For overcoming defects mentioned in the background, an object of the present invention is to provide a stereo visual odometry method based on image gradient joint optimization, which estimates camera pose and position from video sequences Accordingly, in order to accomplish the above object, the present invention provides a stereo visual odometry method based on image gradient joint optimization, comprising steps of:

1) pre-processing each frame of images of a stereo video input;

2) calculating a stereo image disparity map of a same frame of the stereo video, and obtaining a metric distance;

3) scaling each of the images after pre-processing to form scale images with a plurality of scales for forming a pyramid model, and calculating features for each of the scale images in the pyramid model to obtain a series of feature images;

4) processing the images with a Kalman filter according to the metric distance, so to predict and estimate a motion process of a camera pose, wherein camera motion models are built in the Kalman filter;

wherein the camera pose comprises camera positions and directions;

5) accurately calculating a camera pose of a current frame by using a gradient-based stereo visual navigation method for each of the scale images in the pyramid model from larger scales to smaller scales; using outputs of the larger scales as input of the smaller scales;

wherein the larger scales are zoom-out images and the smaller scales are original input images; and 6) updating the camera motion models in the Kalman filter with the camera pose of the current frame;

namely updating camera motion model parameters in the Kalman filter with the camera pose of the current frame.

In the step 1), pre-processing comprises Gaussian filtering and image enhancement operations.

The image enhancement operations are specifically a process of histogram equalization to increase contrast.

In the step 2), a disparity map calculation method is a line search matching method, and the metric distance is a sum of absolute values of pixel differences.

In the step 3), the features are image gradients and second derivative gradients thereof, which is used for calculating image matching error in the step 5).

In the step 4), the Kalman filter is used to predict the motion process of the camera pose in the current frame, which is used for accurately calculating the camera pose in the step 5).

The step 5) estimates the camera pose according to the order from coarse to fine, and solves a large displacement problem of dense visual navigation by the double gradient optimization method, so as to obtain robustness to illumination change by directly using the image gradient as the image feature. At the same time, it also avoids additional computational cost caused by adding affine illumination models to the system, wherein multi-frame information is introduced to optimize system performance and reduce drift.

In the step 5), the gradient-based stereo visual navigation method specifically comprises steps of:

5.1) constructing a joint direct stereo visual odometry optimization equation for calculating a current frame transform $T_c$:

$$\min_{T_c} \sum_{x_i \in \Omega_p} \rho(\nabla I_p(x_i) - \nabla I_c(\pi(T_c(\theta)T_p^{-1}\pi^{-1}(x_i, d_i)))) +$$

$$\sum_{x_i \in \Omega_k} \rho(\nabla I_k(x_i) - \nabla I_c(\pi(T_c(\theta)T_k^{-1}\pi^{-1}(x_i, d_i)))),$$

wherein $\rho(\ )$ is a Tukey's loss function, $\pi^{-1}$ is a function from an image space to a world coordinate system, a is a function from the world coordinate system to the image space, $T_c$ is the current frame transform, and $T_p$ is a previous frame transform, $T_p^{-1}$ is a previous frame inverse transform, $T_k$ represents a reference frame transform, $T_k^{-1}$ is a reference frame inverse transform, $\Omega_k$ represents a pixel set of a reference image, and Q, represents a pixel set of a previous frame, $x_i$ is an image coordinate position of an i-th pixel, $d_i$ is a depth estimation value of the i-th pixel, $\theta$ is a parameter of the current frame transform $T_c$, $\nabla$ is a gradient operator, $I_p$ is a previous frame image, $I_k$ is a reference frame image, $I_c$ is a current frame image;

wherein the reference frame refers to the m-th frame before the current frame, and m=12 in an embodiment of the present invention, wherein the reference frame is the first frame in the first 12 frames; for example, for the first frame at an initial time, the first frame pose is set to zero, orientation and position are both set to zero; for the second to m-th frames, the first frame is used as the reference frame; and for the i-th frame, the i-m-th frame is used as the reference frame;

the Tukey's loss function $\rho(\ )$ is calculated as:

$$\rho(t) = \begin{cases} \frac{\kappa^2}{6}\left[1 - \left(1 - \left(\frac{t}{\kappa}\right)^2\right)^3\right] & \text{for } |t| \le \kappa \\ \frac{\kappa^2}{6} & \text{for } |t| \le \kappa \end{cases},$$

wherein $\kappa$ is a parameter of the Tukey's loss function, which is 4.6851 in the embodiment, and t is an input of the Tukey's loss function; and 5.2) as the above equation is a non-linear optimization problem, iteratively optimizing the joint direct stereo visual mileage optimization equation with a Gauss-Newton method to calculate the current frame transform $T_c$, and then transforming a corresponding pose of the current frame with the current frame transform $T_c$ to obtain an accurate camera pose of the current frame.

Thereby, each frame is processed in chronological order in turn, and an accurate camera pose of each frame can be obtained.

The depth estimation value $d_i$ of the i-th pixel is estimated by stereo depth estimation.

The step 5.2) specifically comprises steps of:

5.2.1) obtaining the parameter $\theta$ of the current frame transform $T_c$ with a following equation:

$$\theta = -(J^T W J)^{-1} J^T W r.$$

wherein J is a Jacobian matrix, $J^T$ is a transpose of the Jacobian matrix, and r is a residual, $r=[\nabla I_p(x_i) - \nabla I_c(\pi(T_c(\theta) T_p^{-1} \pi^{-1}(x_i, d_i))); \nabla I_k(x_i) - \nabla I_c(\pi(T_c(\theta) T_k^{-1} \pi^{-1}((x_i, d_i)))]$, W is a diagonal matrix, and each diagonal position in the diagonal matrix W contains a derivative of the Tukey's loss function p;

5.2.2) according to Lie algebra definition, calculating a temporary transform $T(\theta)$ with a following equation:

$$T(\theta) = \exp\left(\begin{bmatrix} [\omega]_\times & v \\ 0 & 0 \end{bmatrix}\right)$$

wherein v represents displacement, $[\omega]_\times$ is a skew-symmetric matrix, $[\omega]_\times = \omega_1 G_1 + \omega_2 G_2 \omega_3 G_3$, $\omega 1$, $\omega 2$ and $\omega 3$ respectively represent three rotation angles under three-axis coordinates, and G1, G2 and G3 are bases of the skew-symmetric matrix, which are respectively presented as:

$$G_1 = \begin{pmatrix} 0 & 0 & 0 \\ 0 & 0 & -1 \\ 0 & 1 & 0 \end{pmatrix}, G_2 = \begin{pmatrix} 0 & 0 & 1 \\ 0 & 0 & 0 \\ -1 & 0 & 0 \end{pmatrix}, G_3 = \begin{pmatrix} 0 & -1 & 0 \\ 1 & 0 & 0 \\ 0 & 0 & 0 \end{pmatrix};$$

wherein the Lie algebra definition refers to a mathematical algebraic structure, which is mainly used to study geometric objects such as Lie group and differential manifold;

5.2.3) according to the Lie algebra definition, calculating a transform with the temporary transform $T(\theta)$, and assigning a value thereof to the current frame transform $T_c$:

$$T_c \leftarrow T_c T(\theta)$$

wherein $T(\theta)$ is the temporary transform, and 5.2.4) then reconstructing the Jacobian matrix with the current frame transform $T_c$, and repeating the above steps to perform iterative calculation with the pyramid model; wherein a predicted output of the Kalman filter is used as an input of an initial first layer, and an output of a previous layer is used as an input of a next layer, until a stop condition of the iterative calculation is satisfied, wherein the stop condition is $|\theta|<0.001$ or reach a maximum number of iterations $(25\times(l+1))$, where l is a layer number of the pyramid model.

For the initial frame calculation, the initial frame transform $T_c$ and the pose are 0, and the Jacobian matrix corresponding to the initial frame transform $T_c$ is constructed.

The Jacobian matrix is designed for each frame of the images, and a the Jacobian matrix size is identical to an image size.

In the step 5.2.1), the Jacobian matrix is constructed as follows:

for each layer except a last layer, calculating an element value of each pixel in the Jacobian matrix with a following equation, so as to obtained the Jacobian matrix in the step 5.2.1):

$$J_i(\theta) = \nabla I_{esm}(x_i) \cdot \begin{bmatrix} \frac{f_u}{z_i} & 0 & -\frac{f_u x_i}{z_i^2} & -f_u \frac{x_i y_i}{z_i^2} & f_u \frac{x_i^2 z_i^2}{z_i^2} & -\frac{f_u y_i}{z_i} \\ 0 & \frac{f_v}{z_i} & -\frac{f_v y_i}{z_i^2} & -f_v \frac{y_i^2 + z_i^2}{z_i^2} & f_v \frac{x_i y_i}{z_i^2} & \frac{f_v x_i}{z_i} \end{bmatrix} \quad (12)$$

wherein $x_i$, $y_i$ and $z_i$ are coordinate values of the i-th pixel in a three-dimensional world, $f_u$ and $f_v$ are camera focal length parameters, $J_i(\theta)$ indicates the element value in the Jacobian matrix corresponding to the i-th pixel of the image, i is a sequence number of the pixel, $I_{esm}(x_i)$ represents an efficient second order minimization of the current frame;

for the last layer, calculating element value of each pixel in the Jacobian matrix with a following equation, so as to obtained the Jacobian matrix in the step 5.2.1):

$$\tilde{J}_i(\theta) = \nabla I_{esm}(x_i) \cdot \begin{bmatrix} \frac{f_u}{z_i} & 0 & -\frac{\tilde{u}_i}{z_i} & -\frac{\tilde{u}_i \tilde{v}_i}{f_u} & \frac{f_u^2 + \tilde{u}_i^2}{f_u} & -\tilde{v}_i \\ 0 & \frac{f_v}{z_i} & -\frac{\tilde{v}_i}{z_i} & -\frac{f_v^2 + \tilde{v}_i^2}{f_v} & \frac{\tilde{u}_i \tilde{v}_i}{f_v} & \tilde{u}_i \end{bmatrix}$$

wherein $(\tilde{u}_i, \tilde{v}_i)$ is a principal point image coordinate value of a relative image, $\tilde{u}_i = u_i - c_u$, $\tilde{v}_i = v_i - c_v$ and $(u_i, v_i)$ is an image coordinate value of the i-th pixel, $(c_u, c_v)$ is a camera principal point; and calculating the efficient second order minimization $I_{esm}(x_i)$ of the current frame with:

$$\nabla I_{esm}(x_i) = \frac{1}{2}(\nabla I_c(x_i) + \nabla I(x_i)).$$

wherein $I_c$ is the current frame image and $I_k$ is the reference frame image.

The coordinate values $x_i$, $y_i$ and $z_i$ of the i-th pixel in the three-dimensional world are obtained as:

a projection equation of a pinhole camera is defined as $\pi(\ )$, a calculated depth d is estimated by stereo depth estimation, and a three-dimensional point coordinate $X=(x_i, y_i, z_i)$ is obtained by the depth d through an inverse projection equation:

$$\pi^{-1}(x_i, d_i) = \begin{pmatrix} x_i \\ y_i \\ z_i \end{pmatrix};$$

wherein $\pi^{-1}$ is the function from the image space to the world coordinate system, $x_i$ is the image coordinate position of the i-th pixel, and $d_i$ is the depth estimation value obtained by the stereo depth estimation.

The rigid transform function T (including $T_c$, $T_p$, and $T_k$) defined in the present invention transforms in SE(3), wherein SE(3) represents a three-dimensional Lie group, such that a target of visual navigation is the transform function $T=(R, m) \in SE(3)$ which estimates the frame image from image observation, wherein R is a camera direction matrix, $R \in SO(3)$, and SO(3) represents a group with all rotations around an origin of a three-dimensional Euclidean space; m is a position vector, $m \in R3$.

According to the embodiment, the method of the present invention employs a system comprising following three modules:

1) an input module, for receiving a collected stereo video sequence;

2) a visual milemeter module for analyzing images and estimating a current camera pose and position information; and 3) an output module for drawing the camera pose and 3D reconstruction results.

Conventional dense visual navigation algorithm is based on accurate intra-camera parameter calibration and depth observation assumptions, and it is difficult to cope with camera calibration errors in actual systems and parallax estimation with a large amount of noise. According to Taylor's expansion theory, the gradient estimation near the target value is relatively accurate, and the Taylor expansion at different positions will have different gradient estimates. The algorithm proposed by the present invention adopts a Gauss-Newton iteration with a large convergence angle and low precision gradient at the larger scales, and uses a small precision gradient with a convergence domain at the smaller scales. For pyramid low-precision image, the above J is used for calculation, while for the final layer with high precision, ingenious calculation $\tilde{J}$ is used. Thus, the present invention can obtain a more stable gradient relationship, thereby more stably calculating the result of the optimization problem.

Beneficial effects of the present invention are:

The present invention realizes the real-time stereo navigation and solves a large displacement problem of dense visual navigation by the double gradient optimization method, so as to obtain robustness to illumination change by directly using the image gradient as the image feature. At the same time, it also avoids additional computational cost caused by adding affine illumination models to the system, wherein multi-frame information is introduced to optimize system performance and reduce drift.

The present invention proposes an optimization algorithm combining two gradient expansions, and the image gradient is used as a feature to effectively avoid the influence of outdoor illumination changes, and the camera pose is optimized with reference to a plurality of key frames, so as to obtain a real-time stereo visual odometry method with good performance and simultaneous dense 3D reconstruction.

DETAILED DESCRIPTION OF THE PREFERRED EMBODIMENT

The technical solutions of the present invention will be clearly and completely described below in conjunction with the drawings. All other embodiments obtained by those skill in the art based on the embodiments of the present invention without creative efforts are within the scope of the present invention.

In order to make the objects, technical solutions and advantages of the present invention more comprehensible, the embodiments of the present invention will be described in detail with reference to the accompanying drawings.

Figure 1:
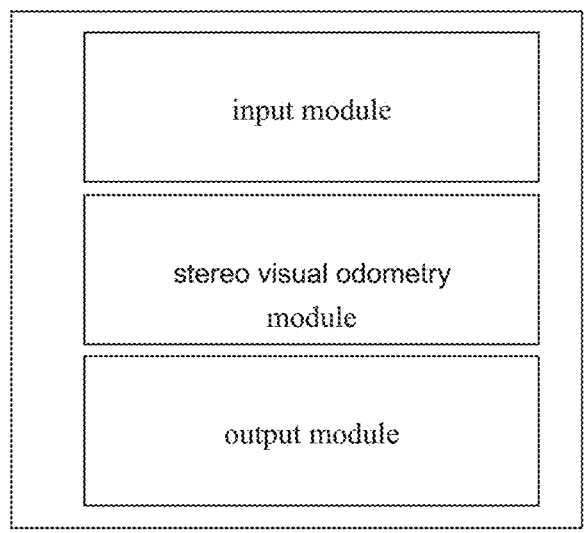
FIG. 1 is an overall structural view of a method according to the present invention.
Figure 2:
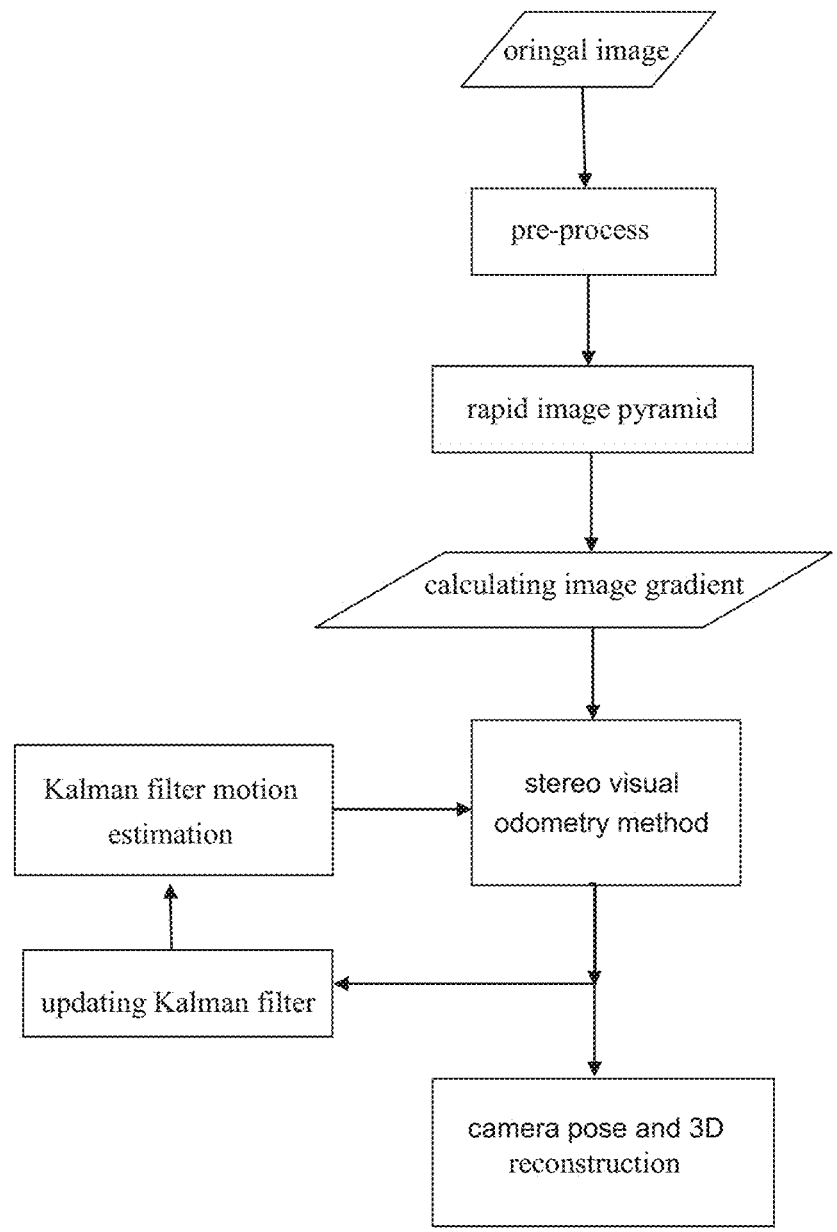
FIG. 2 is a flow chart of the present invention.

Referring to FIG. 1, specific system modules according to an embodiment of the present invention comprise:

an input module for receiving a stereo video sequence provided by a user, and then sending to a visual milemeter module to perform camera pose estimation;

the visual odometry module for pre-processing video frames received, then constructing an image feature pyramid, estimating with a stereo visual odometry method, and the like, so as to estimate camera position and pose information from video, and send into an output module; and the output module for displaying a camera trajectory and a three-dimensional reconstruction result, and presenting the camera trajectory and pose at corresponding positions in three-dimensional reconstruction.

In order to verify the present invention, experiments were carried out on the challenging on-vehicle visual navigation data set KITTI disclosed in the art, and the method of the present invention was compared with a series of published algorithms. Experimental results were compared with high-precision inertial navigator annotations of the test set, wherein the camera trajectory and statistical relative displacement as well as rotation error are plotted as a standard for measuring algorithm performance.

Figure 3:
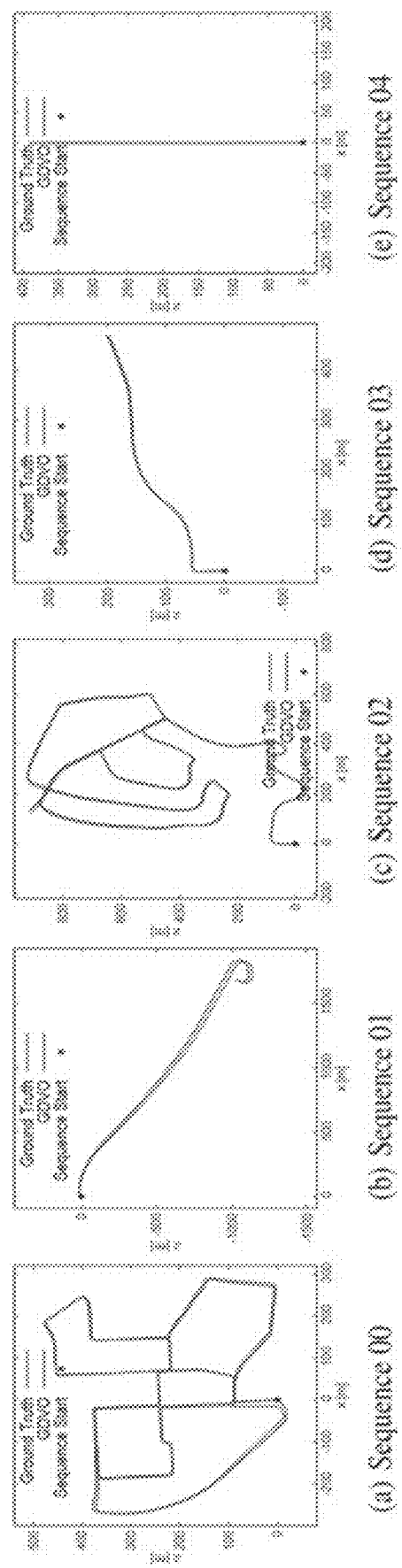
FIG. 3 illustrates camera trajectory results in a KITTI training set according to an embodiment of the present invention.

Referring to FIG. 3, the method of the present invention can accurately restore the camera trajectory. It can be seen that the camera trajectory recovered by the present invention is very close to the measured value of an ultra-high precision inertial measurement unit.

Figure 4:
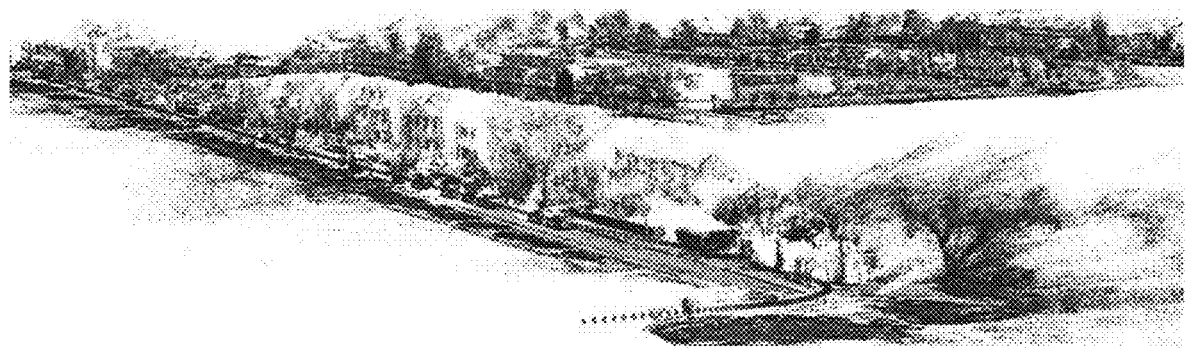
FIG. 4 illustrates 3D point cloud and camera tracking trajectory estimated in the embodiment.

Referring to FIG. 4, the present invention can densely reconstruct a three-dimensional scene. It can be seen that the present invention not only restores dense three-dimensional reconstruction, but also accurately marks a 6-degree-of-freedom camera pose in a three-dimensional scene.

The KITTI visual navigation test platform test set includes 11 segments of different driving scenes and high-precision inertial navigation annotations, wherein the annotation information is unpublished, and test results must be fed back by the tester. The method of the present invention obtains a lower displacement and rotation error than the disclosed related methods, which is even better than a laser radar solution, as shown in Table 1.

TABLE 1

Comparison of various methods in KITTI evaluation (March 2017)

| Rank | Method | Type | Relative displacement % | Relative rotation % |
|---|---|---|---|---|
| 1 | V-LOAM [Zhang and Singh, 2015] | Laser | 0.68 | 0.16 |
| 4 | GDVO (disclosed method) | Direct | 0.86 | 0.31 |
| 6 | SOFT [Cvisic and Petrovic, 2015] | Feature | 0.88 | 0.22 |
| 13 | DEMO [Zhang et al., 2014] | Laser | 1.14 | 0.49 |
| 14 | ORB-SLAM2 [Mur-Artal et al., 2015] | Feature | 1.15 | 0.27 |
| 18 | S-LSD-SLAM [Engel et al., 2015] | Direct | 1.20 | 0.33 |
| 33 | D6DVO [Comport et al., 2010] | Direct | 2.04 | 0.51 |

Accordingly, the results of the present invention not only outperform the conventional methods in the public test, but also restore the dense three-dimensional structure of the scene.

It can be seen that the method of the present invention achieves better experimental results than algorithms commonly used in the field of visual navigation.

Last but not least, the embodiments have been shown and described for the purposes of illustrating the functional and structural principles of the present invention and is subject to change without departure from such principles. One skilled in the art will understand that the embodiment of the present invention as shown in the drawings and described above is exemplary only and not intended to be limiting. Therefore, this invention includes all modifications encompassed within the spirit and scope of the following claims.

What is claimed is:

1. A stereo visual odometry method based on image gradient joint optimization, comprising steps of:
   1) pre-processing each frame of images of a stereo video input;
   2) calculating a stereo image disparity map of a same frame of the stereo video, and obtaining a metric distance;
   3) scaling each of the images after pre-processing to form scale images with a plurality of scales for forming a pyramid model, and calculating features for each of the scale images in the pyramid model to obtain a series of feature images;
   4) processing the images with a Kalman filter according to the metric distance, so to predict and estimate a motion process of a camera pose, wherein camera motion models are built in the Kalman filter;
   5) accurately calculating a camera pose of a current frame by using a gradient-based stereo visual navigation method for each of the scale images in the pyramid model; and
   6) updating the camera motion models in the Kalman filter with the camera pose of the current frame.

2. The stereo visual odometry method, as recited in claim 1, wherein in the step 1), pre-processing comprises Gaussian filtering and image enhancement operations.

3. The stereo visual odometry method, as recited in claim 1, wherein in the step 2), a disparity map calculation method is a line search matching method, and the metric distance is a sum of absolute values of pixel differences.

4. The stereo visual odometry method, as recited in claim 1, wherein in the step 3), the features are image gradients and second derivative gradients thereof.

5. The stereo visual odometry method, as recited in claim 1, wherein in the step 4), the Kalman filter is used to predict the motion process of the camera pose in the current frame.

6. The stereo visual odometry method, as recited in claim 1, wherein in the step 5), the gradient-based stereo visual navigation method specifically comprises steps of:
   5.1) constructing a joint direct stereo visual mileage optimization equation for calculating a current frame transform $T_c$:

$$\min_{T_c} \sum_{x_i \in \Omega_k} \rho(\nabla I_p(x_i) - \nabla I_c(\pi(T_c(\theta)T_p^{-1}\pi^{-1}(x_i, d_i)))) +$$

$$\sum_{x_i \in \Omega_k} \rho(\nabla I_k(x_i) - \nabla I_c(\pi(T_c(\theta)T_k^{-1}\pi^{-1}(x_i, d_i)))),$$

wherein $\rho( )$ is a Tukey's loss function, $\pi^{-1}$ is a function from an image space to a world coordinate system, n is a function from the world coordinate system to the image space, $T_c$ is the current frame transform, and $T_p$ is a previous frame transform, $T_p^{-1}$ is a previous frame inverse transform, $T_k$ represents a reference frame transform, $T_k^{-1}$ is a reference frame inverse transform, $\Omega_k$ represents a pixel set of a reference image, and $\Omega_p$ represents a pixel set of a previous frame, $x_i$ is an image coordinate position of an i-th pixel, $d_i$ is a depth estimation value of the i-th pixel, $\theta$ is a parameter of the current frame transform $T_c$, $\nabla$ is a gradient operator, $I_p$ is a previous frame image, $I_k$ is a reference frame image, $I_c$ is a current frame image;

the Tukey's loss function $\rho( )$ is calculated as:

$$\rho(t) = \begin{cases} \frac{\kappa^2}{6}\left[1-\left(1-\left(\frac{t}{\kappa}\right)^2\right)^3\right] & \text{for } |t| \leq \kappa \\ \frac{\kappa^2}{6} & \text{for } |t| \leq \kappa \end{cases},$$

wherein $\kappa$ is a parameter of the Tukey's loss function, and t is an input of the Tukey's loss function; and 5.2) iteratively optimizing the joint direct stereo visual mileage optimization equation with a Gauss-Newton method to calculate the current frame transform $T_c$, and then transforming a corresponding pose of the current frame with the current frame transform $T_c$ to obtain an accurate camera pose of the current frame.

7. The stereo visual odometry method, as recited in claim 6, wherein the depth estimation value $d_i$ of the i-th pixel is estimated by stereo depth estimation.

8. The stereo visual odometry method, as recited in claim 6, wherein the step 5.2) specifically comprises steps of:

5.2.1) obtaining the parameter $\theta$ of the current frame transform $T_C$ with a following equation:

$$\theta = -(J^TWJ)^{-1}J^TWr,$$

wherein J is a Jacobian matrix, $J^T$ is a transpose of the Jacobian matrix, and r is a residual, $r=[\nabla I_p(x_i)-\nabla I_c(\pi(T_c(\theta)T_p^{-1}\pi^{-1}(x_i,d_i))); \nabla I_k(x_i)-\nabla I_c(\pi(T_c(\theta)T_k^{-1}\pi^{-1}((x_i,d_i)))]$, W is a diagonal matrix, and each diagonal position in the diagonal matrix W contains a derivative of the Tukey's loss function $\rho$, 5.2.2) according to Lie algebra definition, calculating a temporary transform $T(0)$ with a following equation:

$$T(\theta) = \exp\left(\begin{bmatrix} [\omega]_\times & v \\ 0 & 0 \end{bmatrix}\right)$$

wherein v represents displacement, $|\omega|_x$ is a skew-symmetric matrix, $[\omega]_x = \omega_1 G_1 + \omega_2 G_2 + \omega_3 G_3$, $\omega 1$, $\omega 2$ and $\omega 3$ respectively represent three rotation angles under three-axis coordinates, and G1, G2 and G3 are bases of the skew-symmetric matrix, which are respectively presented as:

$$G_1 = \begin{pmatrix} 0 & 0 & 0 \\ 0 & 0 & -1 \\ 0 & 1 & 0 \end{pmatrix}, G_2 = \begin{pmatrix} 0 & 0 & 1 \\ 0 & 0 & 0 \\ -1 & 0 & 0 \end{pmatrix}, G_3 = \begin{pmatrix} 0 & -1 & 0 \\ 1 & 0 & 0 \\ 0 & 0 & 0 \end{pmatrix};$$

5.2.3) according to the Lie algebra definition, calculating a transform with the temporary transform T(8), and assigning a value thereof to the current frame transform $T_c$:

$$T_c \leftarrow T_c T(\theta)$$

wherein $T(\theta)$ is the temporary transform; and 5.2.4) then reconstructing the Jacobian matrix with the current frame transform $T_c$, and repeating the above steps to perform iterative calculation with the pyramid model; wherein a predicted output of the Kalman filter is used as an input of an initial first layer, and an output of a previous layer is used as an input of a next layer, until a stop condition of the iterative calculation is satisfied, wherein the stop condition is $|\theta|<0.001$ or reach a maximum number of iterations $(25\times(l+1))$, where l is a layer number of the pyramid model.

9. The stereo visual odometry method, as recited in claim 8, wherein in the step 5.2.1), the Jacobian matrix is constructed as follows:

for each layer except a last layer, calculating an element value of each pixel in the Jacobian matrix with a following equation, so as to obtained the Jacobian matrix in the step 5.2.1):

$$J_i(\theta) = \nabla I_{esm}(x_i) \begin{bmatrix} \frac{f_u}{z_i} & 0 & -\frac{f_u x_i}{z_i^2} & -f_u\frac{x_i y_i}{z_i^2} & f_u\frac{x_i^2 z_i^2}{z_i^2} & -\frac{f_u y_i}{z_i} \\ 0 & \frac{f_v}{z_i} & -\frac{f_v y_i}{z_i^2} & -f_v\frac{y_i^2+z_i^2}{z_i^2} & f_v\frac{x_i y_i}{z_i^2} & \frac{f_v x_i}{z_i} \end{bmatrix} \quad (12)$$

wherein $x_i$, $y_i$ and $z_i$ are coordinate values of the i-th pixel in a three-dimensional world, $f_u$ and $f_v$ are camera focal length parameters, $J_i(\theta)$ indicates the element value in the Jacobian matrix corresponding to the i-th pixel of the image, i is a sequence number of the pixel, $I_{esm}(x_i)$ represents an efficient second order minimization of the current frame;

for the last layer, calculating element value of each pixel in the Jacobian matrix with a following equation, so as to obtained the Jacobian matrix in the step 5.2.1):

$$\tilde{J}_i(\theta) = \nabla I_{esm}(x_i)\begin{bmatrix} \frac{f_u}{z_i} & 0 & -\frac{\tilde{u}_i}{z_i} & -\frac{\tilde{u}_i \tilde{v}_i}{f_u} & \frac{f_u^2+\tilde{u}_i^2}{f_u} & -\tilde{v}_i \\ 0 & \frac{f_v}{z_i} & -\frac{\tilde{v}_i}{z_i} & -\frac{f_v^2+\tilde{v}_i^2}{f_v} & \frac{\tilde{u}_i\tilde{v}_i}{f_v} & \tilde{u}_i \end{bmatrix}$$

wherein $(\tilde{u}_i, \tilde{v}_i)$ is a principal point image coordinate value of a relative image, $\tilde{u}_i=u_i-c_u$, $\tilde{v}_i=v_i-c_v$ and $(u_i, v_i)$ is an image coordinate value of the i-th pixel, $(c_u,c_v)$ is a camera principal point; and calculating the efficient second order minimization $I_{esm}(x_i)$ of the current frame with:

$$\nabla I_{esm}(x_i) = \frac{1}{2}(\nabla I_c(x_i) + \nabla I(x_i)).$$

wherein $I_c$ is the current frame image and $I_k$ is the reference frame image.

10. The stereo visual odometry method, as recited in claim 9, wherein the coordinate values $x_i$, $y_i$ and $z_i$ of the i-th pixel in the three-dimensional world are obtained as:

a projection equation of a pinhole camera is defined as $\pi(\ )$, a calculated depth d is estimated by stereo depth estimation, and a three-dimensional point coordinate $X=(x_i, y_i, z_i)$ is obtained by the depth d through an inverse projection equation:

$$\pi^{-1}(x_i, d_i) = \begin{pmatrix} x_i \\ y_i \\ z_i \end{pmatrix};$$

wherein $\pi^{-1}$ is the function from the image space to the world coordinate system, $x_i$ is the image coordinate position of the i-th pixel, and $d_i$ is the depth estimation value obtained by the stereo depth estimation.

* * * * *